United States Patent [19]

Mizuta

[11] Patent Number: 5,159,442
[45] Date of Patent: Oct. 27, 1992

[54] COLOR SIGNAL PROCESSING APPARATUS

[75] Inventor: Masashi Mizuta, Kanagawa, Japan

[73] Assignee: Sony Corporation, Tokyo, Japan

[21] Appl. No.: 591,467

[22] Filed: Oct. 1, 1990

[30] Foreign Application Priority Data

Oct. 4, 1989 [JP] Japan .................. 1-259440

[51] Int. Cl.[5] .................. H04N 9/64; H04N 9/68
[52] U.S. Cl. .................. 358/37
[58] Field of Search .................. 358/37

[56] References Cited

U.S. PATENT DOCUMENTS

| | | | |
|---|---|---|---|
| 4,041,531 | 8/1977 | Bingham | 358/37 |
| 4,343,017 | 8/1982 | Wilkinson | 358/31 |
| 4,402,006 | 8/1983 | Karlock | 358/37 |
| 4,504,853 | 3/1985 | Faroudja | 358/37 |
| 4,935,806 | 6/1990 | Rabii | 358/37 |

FOREIGN PATENT DOCUMENTS

| | | | |
|---|---|---|---|
| 0342511A3 | 11/1989 | European Pat. Off. . | |
| 0342511A2 | 11/1989 | European Pat. Off. . | |
| 205379 | 11/1983 | Japan | 358/37 |
| 61283 | 4/1984 | Japan | 358/169 |
| 221294 | 9/1987 | Japan | 358/37 |
| 2171272 | 8/1986 | United Kingdom . | |

OTHER PUBLICATIONS

"A New Single Chip LSI for an NTSC CTV Signal Processing", by Yoshimochi et al., 8087 IEEE Transactions on Cosumer Electronics, Aug. 1989, No. 3, New York, pp. 297-306.

Hickok, Amplitude and Phase Sensitive Comb Filter, Research Disclosure, Sep. 1978, pp. 56-57.

*Primary Examiner*—John W. Shepperd
*Attorney, Agent, or Firm*—Hill, Van Santen, Steadman & Simpson

[57] ABSTRACT

A color signal processing apparatus comprising a first delay circuit for delaying an input chroma signal; a second delay circuit for delaying an output of the first delay circuit; a plurality of gain control circuits for controlling the amplitudes of the input chroma signal and the outputs of the first and second delay circuits, respectively; and an operating circuit for operating the gain-controlled amplitudes of the input chroma signal and the outputs of the first and second delay circuits, wherein the phases of the outputs of the first and second delay circuits are matched with the phase of the input chroma signal.

4 Claims, 6 Drawing Sheets

FIG. 1 (PRIOR ART)

FIG. 2A (PRIOR ART) Input Signal

FIG. 2B (PRIOR ART) Delayed Signal

FIG. 2C (PRIOR ART) Delayed Signal

FIG. 2D (PRIOR ART) Differential Signal

FIG. 2E (PRIOR ART) Control Signal

FIG. 2F (PRIOR ART) Modulated Signal

FIG. 2G (PRIOR ART) Output Signal

FIG. 11A Original Signal

FIG. 11B Input Signal

FIG. 11C Enhanced Signal

FIG. 11D Output Signal even number 5,159,442

COLOR SIGNAL PROCESSING APPARATUS

BACKGROUND OF THE INVENTION

The present invention generally relates to color signal processing apparatus and, more particularly, is directed to a color signal enhancer for use in, for example, a video tape reproducing apparatus.

In U.S. Pat. No. 4,504,853, the teachings of which are fully incorporated herein by reference, there is discussed a color signal enhancer circuit used in a video apparatus such as a video tape recorder (VTR). In the abstract it is stated that the circuit enhances aperiodic transitions occurring in a quadrature modulated subcarrier by deriving a control signal from simultaneously occurring aperiodic transitions in the baseband of the carrier, such as luminance or chrominance, without demodulation of the chroma subcarrier.

Figure 1:
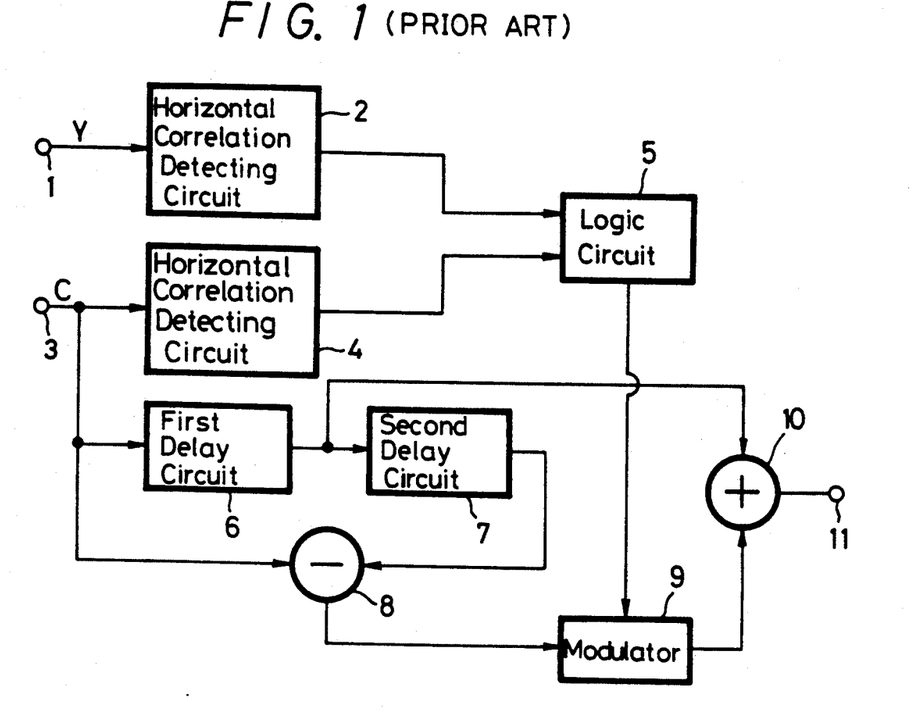
FIG. 1 is a schematic block diagram of an example of a conventional color signal enhancer.

Referring to FIG. 1 of the present specification, there is shown an input terminal 1 to which a luminance signal Y separated from a video signal is applied. The luminance signal Y applied to the input terminal 1 is supplied to a horizontal correlation detecting circuit 2.

There is shown an input terminal 3 to which a chroma signal C separated from the video signal is supplied. The chroma signal C applied to the input terminal 3 is supplied to a horizontal correlation detecting circuit 4. In that case, the chroma signal C is a signal modulated by a color subcarrier of 3.58 MHz.

Horizontal correlation detected signals from the horizontal correlation detecting circuits 2 and 4 are supplied to a logic circuit 5. The logic circuit 5 derives a predetermined control signal when a changing point of the luminance component and a changing point of the chroma component coincide with each other. The control signal from the logic circuit 5 is supplied to a modulator 9 which will be described later.

The chroma signal C applied to the input terminal 3 is supplied to a series circuit of first and second delay circuits 6 and 7. The input signal supplied to the first delay circuit 6 and an output signal from the second delay circuit 7 are supplied to a subtracting circuit 8 which generates a difference signal therebetween as a subtracted output. This difference signal is supplied to the modulator 9, in which the difference signal is amplitude by the control signal supplied thereto from the logic circuit 5. The modulated signal from the modulator 9 and the output signal of the first delay circuit 6 are supplied to an adder 10, from which an added signal is supplied to a chroma signal output terminal 11.

A series of waveform diagrams for signals present in this prior art circuit arrangement is illustrated in FIGS. 2A-2G.

Figure 2A:
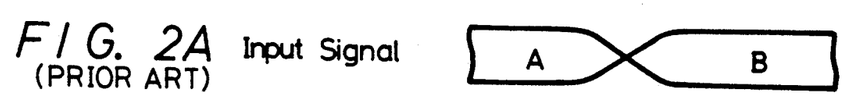
FIGS. 2A-2G are a series of waveform diagrams used in understanding operation of the color signal enhancer of FIG. 1.
Figure 2B:
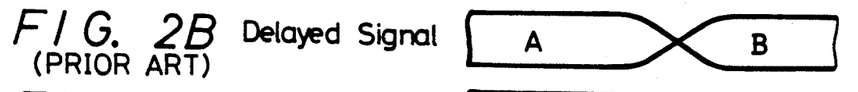
Figures 2C, 2D:
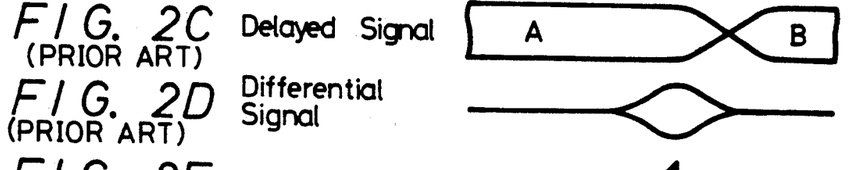
Figures 2E, 2F:
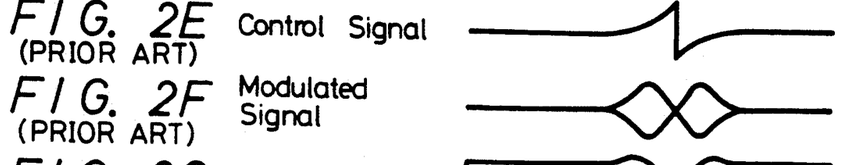
Figure 2G:
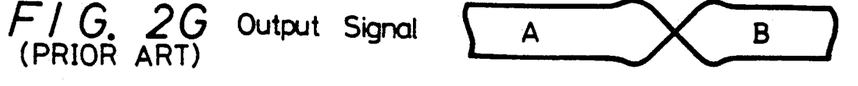

In this prior art circuit arrangement, when a chroma signal at a changing point of predetermined colors A and B as shown in FIG. 2A is inputted, the first delay circuit 6 generates a delay signal (see FIG. 2B) and the second delay circuit 7 generates a delay signal (see FIG. 2C). The subtracter 8 subtracts the input signal and the delayed signal by the second delay circuit 7 from each other to generate a differential signal (see FIG. 2D). This differential signal is modulated by the control signal shown in FIG. 2E into a modulated signal (see FIG. 2F) which crosses at a zero crossing point. This modulated signal is added to the output signal of the first delay circuit 6 by the adder 10 so that a chroma signal, which changes rapidly from color A to color B (see FIG. 2G), is developed at the output terminal 11.

As described above, the change of the chroma signal is rapidly carried out, whereby a contour of a reproduced picture is emphasized. Thus, the conventional circuit of FIG. 1 functions as the enhancer.

However, the prior art color signal enhancer is large in scale, complicated in arrangement and very expensive.

Further, in the standard video tape recorder, the chroma signal passes through a bandpass filter a plurality of times upon recording and reproducing so that a characteristic of a reproduced chroma signal finally outputted is disturbed. In other words, if a bandpass filter having rapid characteristic is utilized, group delay characteristics are not uniform so that a so-called overshoot tends to occur behind the zero crossing point of the color signal.

SUMMARY OF THE INVENTION

The present invention provides an improved color signal processing apparatus which can eliminate the aforenoted shortcomings and disadvantages encountered with the prior art. More specifically, the present invention provides a color signal processing apparatus in which a color signal can be enhanced by a simplified circuit arrangement.

The present invention also provides a color signal processing apparatus which can improve total characteristics of a color signal and/or a color signal processing apparatus which can obtain a satisfactory color signal. Yet further, the present invention provides a color signal processing apparatus which is suitably applied to a digital signal processing.

To these ends, in one embodiment, the invention provides a color signal processing apparatus comprised of a first delay circuit for delaying an input chroma signal, a second delay circuit for delaying an output of the first delay circuit, a plurality of gain control circuits for controlling the amplitudes of the input chroma signal and the outputs of the first and second delay circuits, respectively, and an operating circuit for operating the gain-controlled amplitudes of the input chroma signal and the outputs of the first and second delay circuits, wherein the phases of the outputs of the first and second delay circuits are matched with the phase of the input chroma signal.

In another embodiment, the invention provides a color signal processing apparatus comprised of a first delay circuit for delaying a chroma signal, a second delay circuit connected in series to the first delay circuit for delaying a delayed output signal of the first delay circuit, a first subtracting circuit for obtaining a first difference between the input and output signals of the first delay circuit, a second subtracting circuit for obtaining a second difference between the input and output signals of the second delay circuit, a first signal processing circuit for processing the first difference signal to obtain a first enhanced signal, a second signal processing circuit for processing the second difference signal to obtain a second enhanced signal, a first adding circuit for adding the first and second enhanced signals of the first and second signal processing circuit, and a second adding circuit for adding an added enhanced signal of the first adding circuit to the output signal of the first delay circuit.

These and other features and aspects of the invention as well as advantages thereof will be apparent in the following detailed description of the presently preferred embodiments when read in conjunction with the accompanying drawings, in which like reference numerals are used to identify the same or similar parts in the several views.

DETAILED DESCRIPTION OF THE PRESENTLY PREFERRED EMBODIMENTS

An embodiment of the color signal enhancer according to the present invention will now be described in detail with reference to FIGS. 3 to 9.

Figure 3:
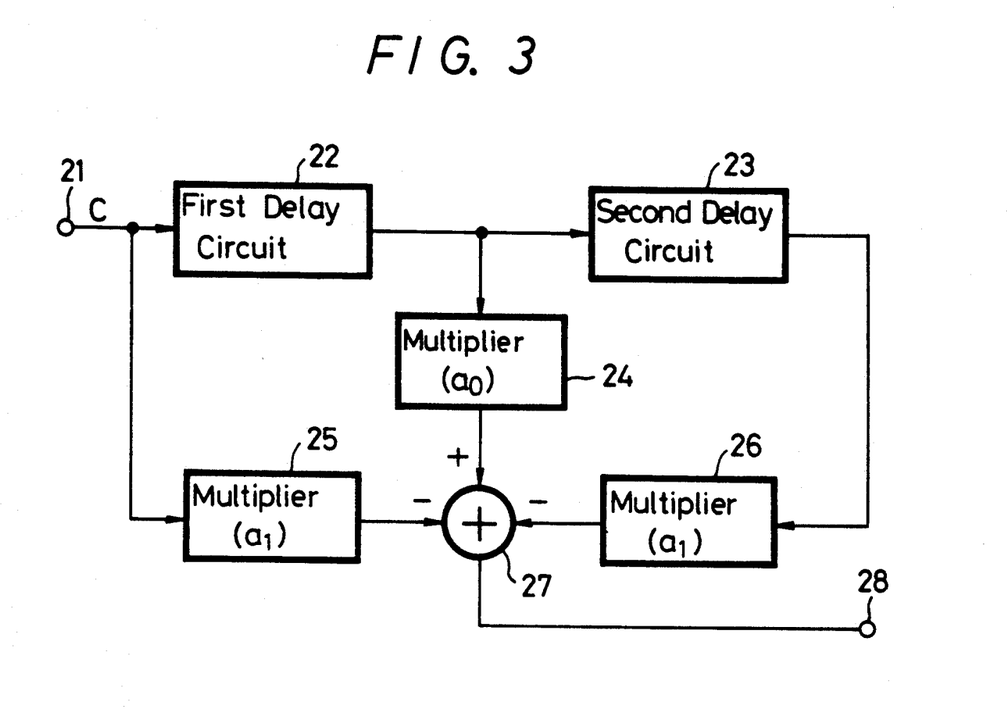
FIG. 3 is a schematic block diagram of an arrangement of a color signal enhancer embodying principles of the present invention.

FIG. 3 shows a fundamental arrangement of a color signal enhancer of the present invention.

Referring to FIG. 3, there is shown an input terminal 21 to which a chroma signal C separated from a video signal is supplied. The chroma signal C applied to the input terminal 21 is supplied to a series circuit of first and second delay circuits 22 and 23. In that case, the chroma signal C is a signal modulated by a color subcarrier of 3.58 MHz, and in each of the first and second delay circuits 22 and 23, the phases of the input and output signals are matched at 3.58 MHz. That is, the delay circuits 22 and 23 may each be a delay circuit having a delay amount of integer multiple of one wavelength or may be a delay circuit formed of a phase equalizer.

An output signal from the first delay circuit 22 is supplied through a multiplier 24 having a coefficient $a_0$ to a computing circuit 27. The chroma signal C applied to the input terminal 21 and an output signal from the second delay circuit 23 are supplied through multipliers 25 and 26 each having a coefficient $a_1$ to the computing circuit 27. In the computing circuit 27, the outputs from the multipliers 25 and 26 are subtracted from the output of the multiplier 24, and an output signal from the computing circuit 27 is fed to an output terminal 28.

Figure 4:
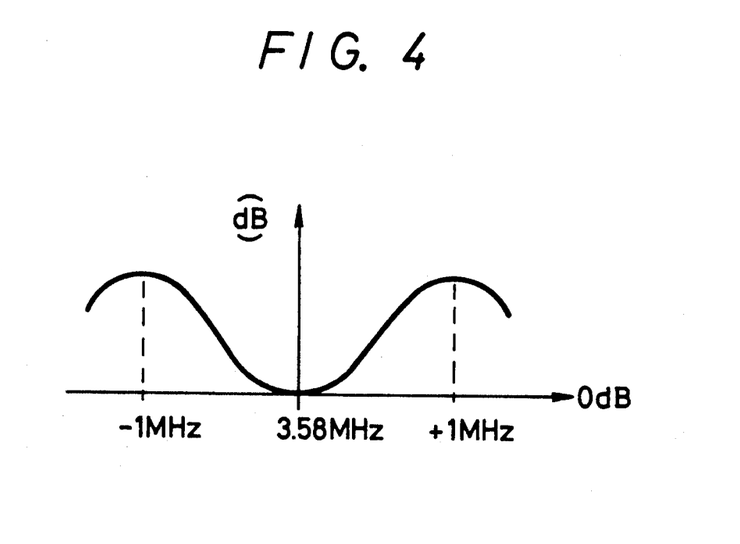
FIG. 4 is a graph used to explain the color signal enhancer of FIG. 3.

Thus, a so-called finite impulse response (FIR) type filter is constructed and this FIR type filter produces a cosine characteristic shown in FIG. 4. That is, a characteristic curve is represented by $a_0 + 2a_1 \cos(2\pi f.T)$ in FIG. 4 and in that case, a phase characteristic is linear. When the chroma signal is processed by this FIR type filter, the signal is changed more rapidly at the color changing point of the chroma signal. Therefore, the circuit of FIG. 3 functions as the color signal enhancer.

Figure 5:
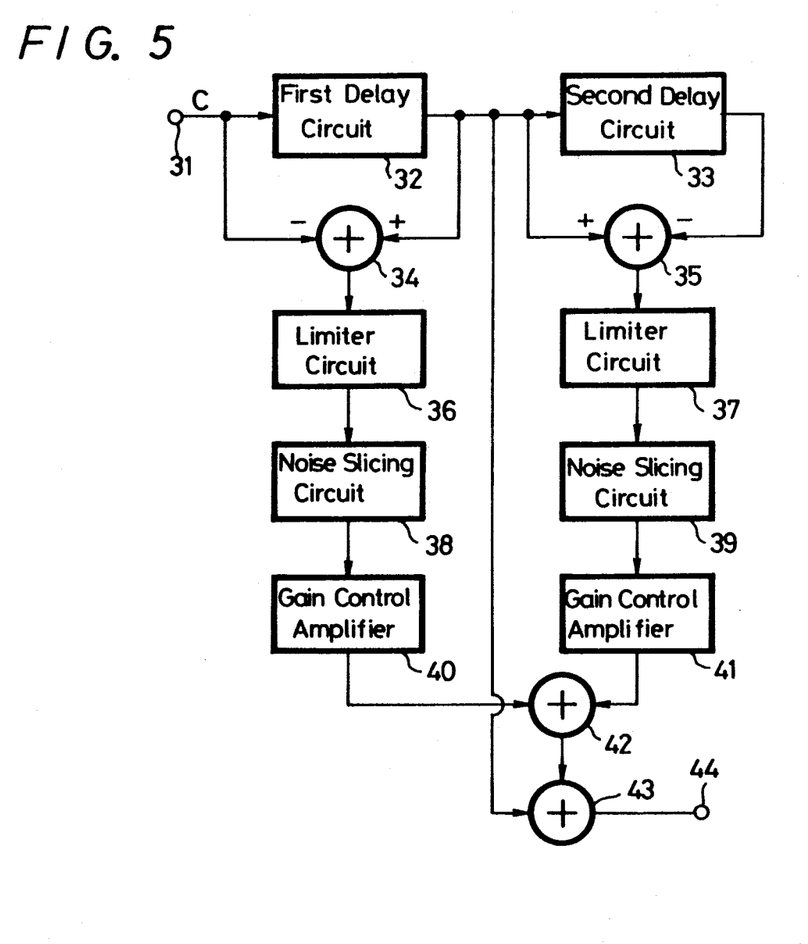
FIG. 5 is a schematic block diagram of a color signal enhancer embodying principles of the present invention.

FIG. 5 shows an embodiment of the color signal enhancer according to the present invention in which the FIR type filter of FIG. 3 is incorporated in actual practice.

With reference to FIG. 5, there is shown an input terminal 31 to which a chroma signal C separated from the video signal is applied. The chroma signal C applied to the input terminal 31 is supplied to a series circuit of first and second delay circuits 32 and 33. In that case, the chroma signal C may be a signal modulated by the color subcarrier of 3.58 MHz, and a delay time of each of the delay circuits 32 and 33 may be selected to be, for example, an integer multiple of one wavelength of the chroma signal C.

Input and output signals of the first delay circuit 32 are supplied to a subtracter 34, in which the input of the first delay circuit 32 is subtracted from the output thereof, and input and output signals of the second delay circuit 33 are supplied to a subtracter 35, in which the output of the second delay circuit 33 is subtracted from the input thereof. The subtracters 34 and 35 derive difference signals between the input and output signals, and the resultant difference signals are supplied to series circuits of limiters 36, 37, noise slicing circuits 38, 39 and gain control amplifiers 40 and 41 are supplied to and added together by an adder 42, and an output signal of the adder 42 is supplied to an adder 43.

The output signal of the first delay circuit 32 is supplied to the adder 43, and the output signal of the first adder 32 and an output signal of the adder 42 are added together by the adder 43. An added output from the adder 43 is fed to a chroma signal output terminal 44.

Figure 6:
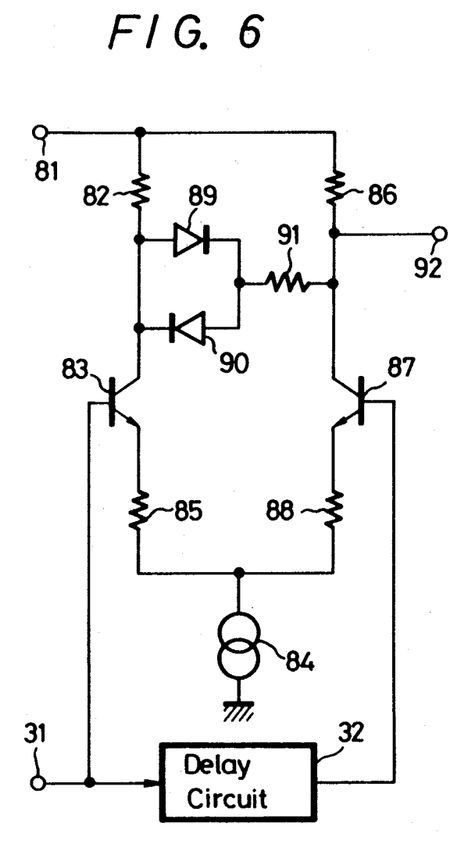
FIG. 6 is a schematic diagram of an example of a limiter circuit in an embodiment of the present invention.

FIG. 6 shows an example of a specific circuit arrangement of the limiter circuit wherein the difference signal obtained through the delay circuit is limited by the limiter circuit.

With reference to FIG. 6, the input and output signals of, for example, the delay circuit 32 are supplied to the bases of NPN transistors 83 and 87, respectively. A voltage source terminal 81 is connected through a resistor 82 to the collector of the NPN transistor 83 and is also connected through a resistor 86 to the collector of the NPN transistor 87. A constant current source 84 is connected through a resistor 85 to the emitter of the NPN transistor 83 and is also connected through a resistor 88 to the emitter of the NPN transistor 87. The collector of the NPN transistor 83 is connected to an anode of a diode 89 and to a cathode of a diode 90. A cathode of the diode 89 and an anode of the diode 90 are connected through a resistor 91 to the collector of the NPN transistor 87, and an output terminal 92 is led out from the collector of the NPN transistor 87. Consequently, a difference between the input and output signals of the delay circuit 32 can be obtained and a difference signal whose large amplitude is limited by the diode is developed at the output terminal 92, thereby constructing the circuit arrangement from the delay circuit 32 to the limiter 36 (or from the delay circuit 33 to the limiter 37).

Figure 7:
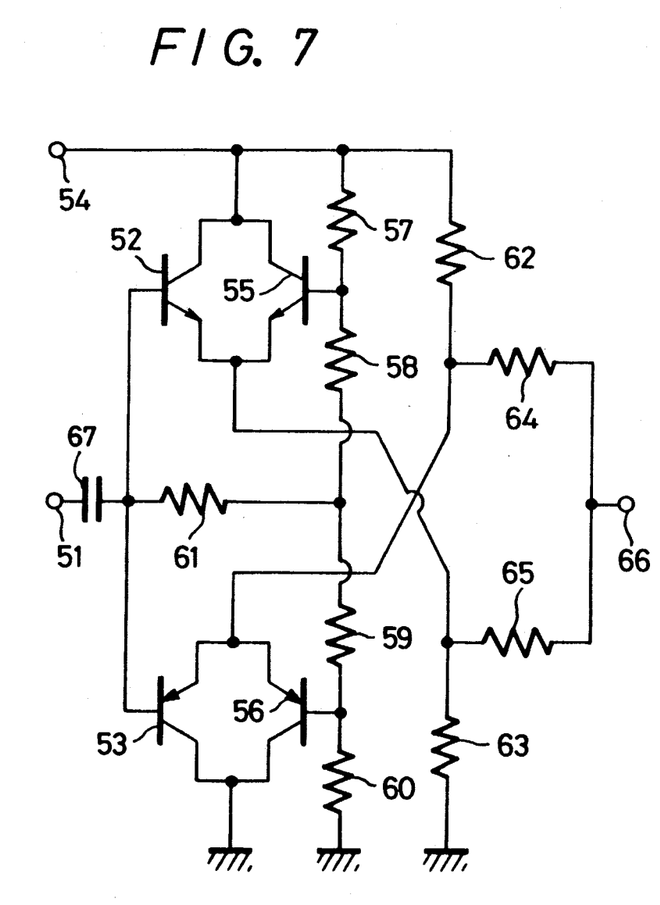
FIG. 7 is a schematic diagram of an example of a noise slicing circuit used in an embodiment of the present invention.

FIG. 7 shows an example of a specific circuit arrangement of the noise slicing 38 (or 39).

With reference to FIG. 7, an input signal applied to an input terminal 51 is supplied through a capacitor 67 to the bases of NPN transistor 52 and PNP transistor 53, and the emitters and collectors of the NPN transistor 52 and PNP transistor 53 are respectively coupled to the emitters and collectors of NPN transistors 55 and 56. A voltage source terminal 54 is coupled to the collectors of the NPN transistors 52 and 55, and the emitters of the PNP transistors 53 and 56 are grounded. The voltage source terminal 54 is grounded by way of a series circuit of four resistors 57, 58, 59 and 60. The base of the NPN transistor 55 is connected to a junction between the resistors 57 and 58 and the base of the PNP transistor 56 is connected to a junction between the resistors 59 and 60.

Further, the bases of the NPN transistor 52 and PNP transistor 53 are connected through a resistor 61 to a junction between the resistors 58 and 59. The voltage source terminal 54 is connected through a resistor 62 to the emitters of the PNP transistors 53 and 56, and the emitters of the NPN transistors 52 and 55 are grounded via a resistor 63. The emitters of the PNP transistors 53 and 56 are connected through a resistor 64 to an output terminal 66, and the emitters of the NPN transistors 52 and 55 are connected through a resistor 65 to an output terminal 66.

The noise slicing circuit is constructed as described above so that a signal in which a noise component contained in the chroma signal applied to the input terminal 31 is removed is developed at the output terminal 66.

Figure 8:
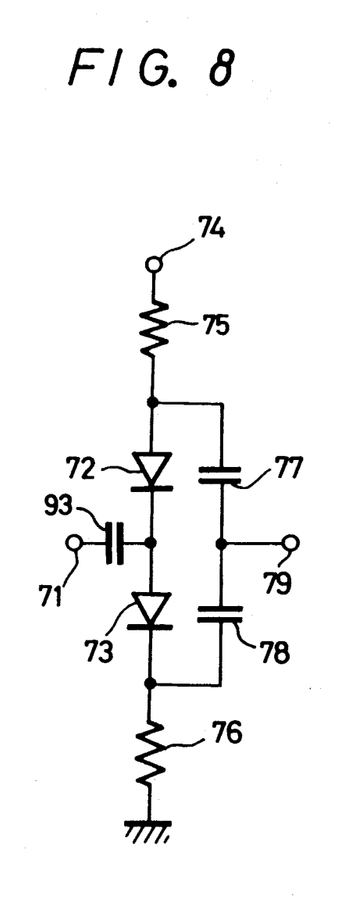
FIG. 8 is a schematic diagram of another example of a noise slicing circuit used in an embodiment of the present invention.

Alternatively, the aforenoted noise slicing circuit may be modified as, for example, shown in FIG. 8.

Referring to FIG. 8, a chroma signal applied to an input terminal 71 is supplied through a capacitor 93 to a cathode of a diode 72 and to an anode of a diode 73. A voltage source terminal 74 is connected through a resistor 75 to an anode of the diode 72, and a cathode of the diode 73 is grounded via a resistor 76. The anode of the diode 72 is connected through a series circuit of capacitors 77 and 78 to the cathode of the diode 73, and a junction between the capacitors 77 and 78 is connected to an output terminal 79.

According to this arrangement, a signal from which a noise component is removed is developed at the output terminal 79.

An operation of the color signal enhancer circuit of the present invention shown in FIG. 5 will be described next with reference to FIGS. 9A-9I to FIGS. 11A-11D.

Figure 9A:
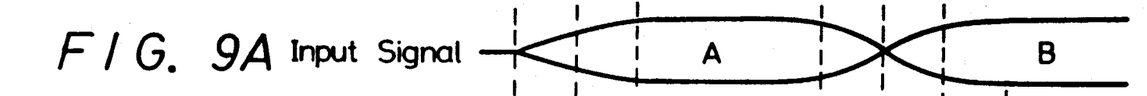
FIGS. 9A-9I are waveform diagrams of signals present in an embodiment of the invention, and to which reference will be made in explaining an operation of embodiments of the present invention.
Figure 9B:
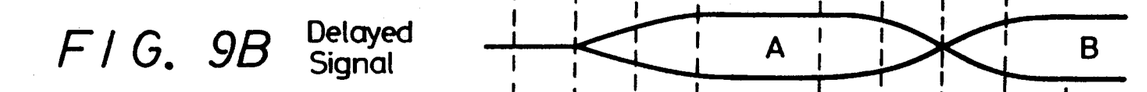
Figure 9C:
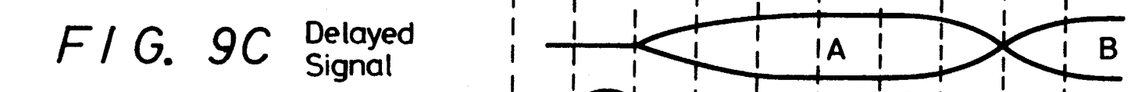
Figure 9D:
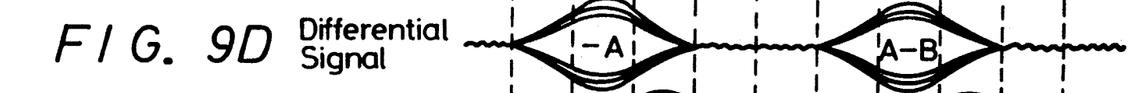
Figure 9E:
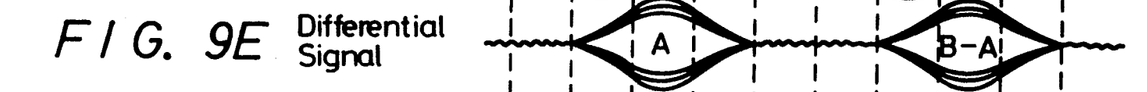
Figure 9F:
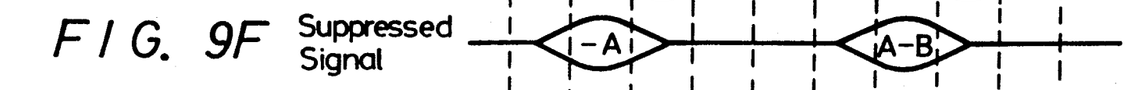
Figure 9G:
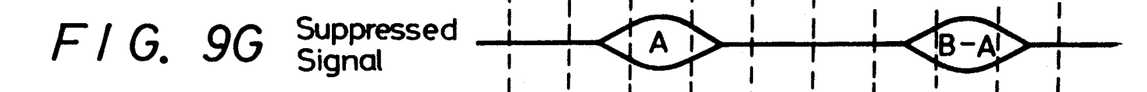

When a chroma signal having a changing point of predetermined colors A and B as shown in FIG. 9A is supplied to the input terminal 31, the first delay circuit 32 derives a delay signal (see FIG. 9B) and the second delay circuit 33 derives a delay signal (see FIG. 9C). The subtracter 34 subtracts the input signal and the delay signal of the first delay circuit 32 from each other to provide a differential signal (see FIG. 9D). The subtracter 35 subtracts the delay signal of the first delay circuit 32 and the delay signal of the second delay circuit 33 from each other to provide a differential signal (see FIG. 9E).

Figure 10:
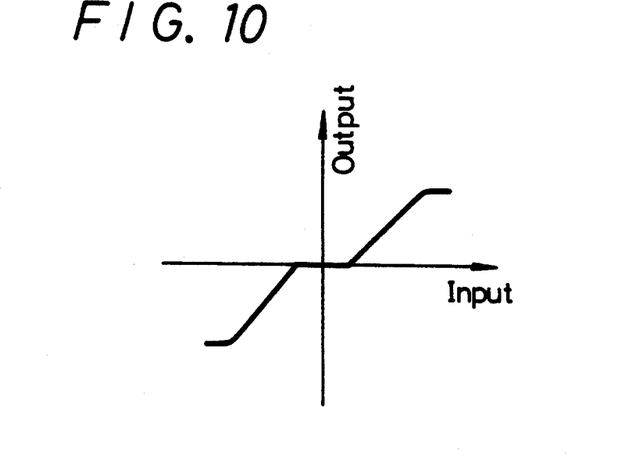
FIG. 10 is a schematic diagram of input versus output characteristics of an embodiment of the present invention.

Since the limiters 36, 37 and the noise slicing circuits 38, 39 are respectively connected to the subtracters 34 and 35 as shown in FIG. 5, the amplitudes of the respective differential signals are limited and they are converted into suppressed signals (see FIGS. 9F and 9G) from which the noise components are removed. In that case, the color subcarrier components (3.58 MHz) of the two suppressed signals are inverted in phase. A total characteristic (i.e. input versus output characteristic) of the limiters 36, 37 and the noise slicing circuits 38, 39 is represented in a graph of FIG. 10.

Figure 9H:
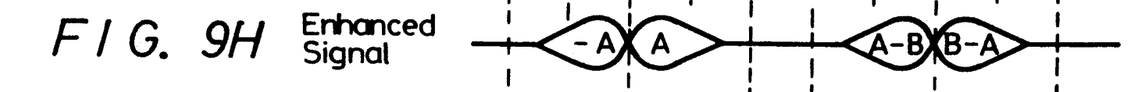
Figure 9I:
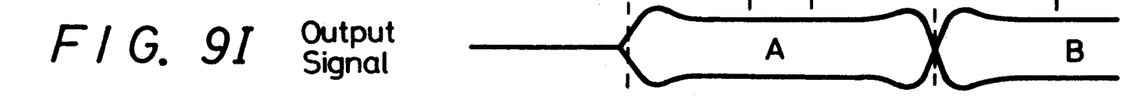

The two suppressed signals are added by the adder 42 to provide an enhanced signal (see FIG. 9H). This enhanced signal is added to the output signal of the first delay circuit 32 in the adder 43 so that a chroma signal having a steep color changing point (see FIG. 9I) is developed at the output terminal 44.

As described above, the circuit of FIG. 5 functions as the chroma signal enhancer and in this embodiment, a disturbance of the chroma signal characteristic can be corrected simultaneously.

Figure 11A:
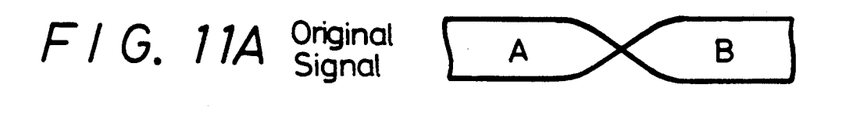
FIGS. 11A-11D are waveform diagrams of signals useful in understanding embodiments of the present invention.

More specifically, the chroma signal in the video signal reproduced by the video tape recorder is processed a plurality of times by the bandpass filter so that group delay frequency characteristics are disturbed. Therefore, a chroma signal in which the change from the color A to the color B is uniform as shown in FIG. 11A is processed a plurality of times by the bandpass filter so that an overshoot occurs behind the color changing point as shown in FIG. 11B.

Figure 11B:
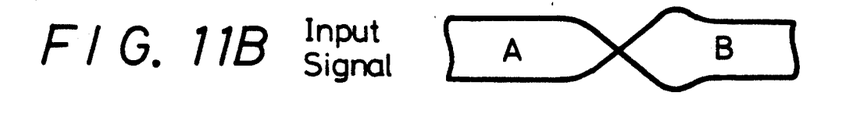
Figure 11C:
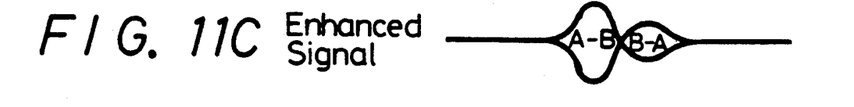
Figure 11D:
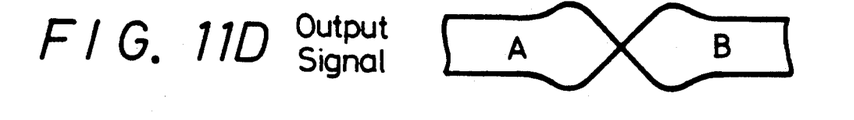

When a signal such as that shown in FIG. 11B is processed by the color signal enhancer of this embodiment, the gain of the gain control amplifier 40 and the gain of the gain control amplifier 41 are made nonuniform and a signal whose waveform is not uniform before and after the color changing point, as is shown in FIG. 11C, is generated as the enhanced signal, whereby an output signal at the output terminal 44 is corrected to be a signal whose waveform is uniform before and after the color changing point as shown in FIG. 11D.

As described above, according to the color signal enhancer of this embodiment, the waveform change of the chroma signal at its color changing point can be made steep by the simplified circuit arrangement of delay and computing processings. At the same time, the disturbance of the chroma signal due to the plurality of processings by the bandpass filter can be corrected totally. In that case, a luminance signal need not be utilized in the signal processing. Further, since the color signal enhancer of this embodiment requires only the delay processing and the computing processing, the color signal enhancer of the invention can be suitably applied to a digital signal processing.

Further, while the waveform change in the horizontal direction of the chroma signal is made steep in the aforenoted embodiment, if a delay circuit which delays a signal by one horizontal period is utilized as the first and second delay circuits 32 and 33, then the color signal enhancer of the present invention can make the waveform change in the vertical direction of the chroma signal steep.

Furthermore, while the FIR filter is arranged as a 3-tap (the input signal, the output signal of the first delay circuit 32, and the output signal of the second delay circuit 33) FIR filter in the above-described embodiment, if the FIR filter is arranged as an FIR filter having more than three taps, the waveform change can be made more steep.

In addition, the limiter circuits and the noise slicing circuits of the present invention are not limited to those shown in FIGS. 6 to 8 and may be formed of other circuit arrangements according to the prior art.

As set forth above, according to the present invention, the enhanced signal is formed by the simplified circuit arrangement of the delay and computing circuits and the color signal can be enhanced with ease. In that case, the enhanced signal is formed by the signals in phase so that, when the coefficients are multiplied before the addition and the subtraction, the total characteristic of the color signal can be improved at the same time and a satisfactory color signal can be outputted.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A color signal processing apparatus comprising:
   (a) first delay means for delaying a chroma input signal to produce delayed output signal;
   (b) second delay means connected to series to said first delay means for delaying said delayed output signal of said first delay means;
   (c) first subtracting means operatively disposed for obtaining a first difference between the input and output signals of said first delay means;
   (d) second subtracting means operatively disposed for obtaining a second difference between the input and output signals of said second delay means;
   (e) first signal processing means operatively disposed for processing said first difference signal to obtain a first enhanced signal;
   (f) second signal processing means operatively disposed for processing said second difference signal to obtain a second enhanced signal;
   (g) first adding means operatively disposed for adding said first and second enhanced signals of said first and second signal processing means; and
   (h) second adding means operatively disposed for adding an added enhanced signal of said first adding means to the output signal of said first delay means.

2. The apparatus of claim 1, wherein each of said first and second signal processing means comprises a limiter circuit, a noise slicing circuit, and a gain control amplifier connected in series.

3. The apparatus of claim 1, wherein phases of the input and output signals of said first delay means are matched with each other.

4. The apparatus of claim 1, wherein phases of the input and output signals of said second delay means are matched with each other.

* * * * *